Nov. 26, 1963     T. H. BATZER     3,112,095
FLUID PRESSURE AND CAM OPERATED VACUUM VALVE
Filed Nov. 17, 1960
Fig. 1.
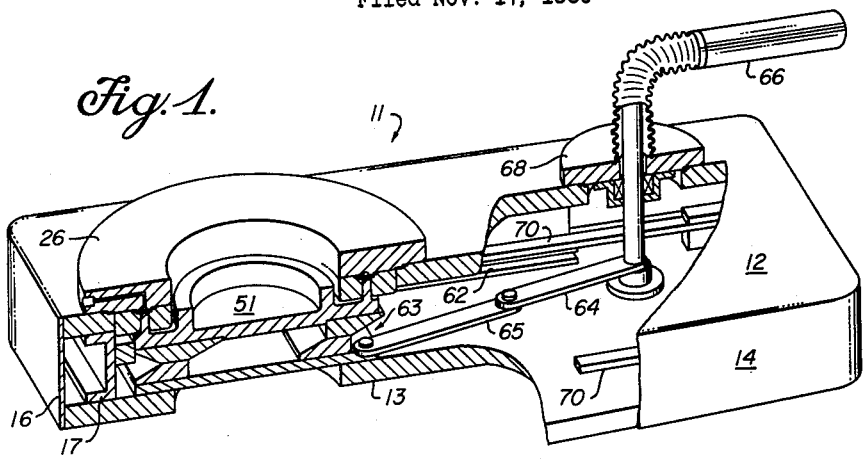
Fig. 2.
Fig. 3.
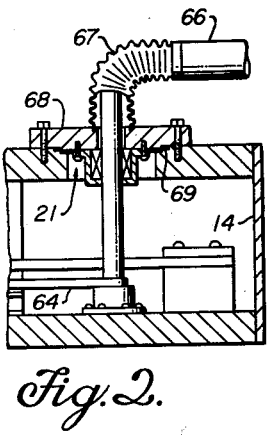
INVENTOR.
THOMAS H. BATZER
BY
Roland A. Anderson
ATTORNEY.

United States Patent Office 3,112,095
Patented Nov. 26, 1963

3,112,095
FLUID PRESSURE AND CAM OPERATED VACUUM VALVE
Thomas H. Batzer, Livermore, Calif., assignor to the United States of America as represented by the United States Atomic Energy Commission
Filed Nov. 17, 1960, Ser. No. 70,087
1 Claim. (Cl. 251—172)

This invention relates to vacuum valves and closures in general and specifically this invention relates to quick disconnect bakable valves and closures sealing against pressurized flexible metal gaskets.

The invention provides a vacuum valve or closure for ultra-high vacuum application which is readily bakable and easily disconnected or closed, yet which employs no organic lubricants or parts. Functionally, these provisions are accomplished by structure which releasably and deformably clamps an overlapping annular gasket onto each side of an annular groove in a closure plate or around an opening to be closed. The clamping means are disposed to permit annular access to the upper face of the clamped gasket. A closure or valve component having an annular ridge is seated in close tolerance against the upper side of the gasket. Means are provided for introducing a fluid to the underside of the gasket whereby the gasket is forced against the annular ridge in a sealing relation. Novelty is seen in the precise embodiments and combinations of components hereinafter discussed.

In the high vacuum art, vacuums higher than about $10^{-6}$ mm. Hg were generally not required or thought to be desirable prior to nuclear applications in the 1940's. However, in the present technology of mass spectrometers, particle accelerators, controlled thermonuclear reactions, electronic applications, space research and associated fields, pressures of $10^{-8}$ mm. Hg and lower are frequently desired. Typical optimum requirements for vacuum pumps in modern technology are exemplified in plasma containment experiments, accelerator systems and ion sources in which an almost absolute gaseous sink relationship must be maintained. In the use of such equipment, energetic charged particles and energetic neutral particles are continuously introduced or produced in the system. The vacuum pump or sink must be capable of both initial evacuation and subsequent removal of the total output of desirable fast particles and an irreducible amount of slow neutral particles to maintain a very low density of "cold" neutral gas.

In the past, principal reliance has been placed upon deformable metal gaskets in joining surfaces, usually flanged, for vacuum applications. Such surfaces are held in contiguous relation with the gasket therebetween by means of circumferential bolts which must be successively tightened and tested, by a long and tedious process for ultra high vacuums. The gaskets are deformed and accordingly cannot be used a second time.

Numerous attempts have been made since the advent of the nuclear sciences to develop valves for ultra high vacuum applications which exhibit complete vacuum integrity. Many such valves are extensions of the prior valve art in which organic parts or lubricants are used with attendant slow organic vaporization. The use of organics precludes bake-out, also, with the result that there is a constant degassing effect during operation. Other valves which dispense with organics are generally not entirely leak proof. The result is that with either alternative, there is a constant degassing or leak which must be taken into consideration in pumping requirements. Truly leakproof and gas free valves generally have a complicated unwieldy mechanism, as by the use of a low melting metal along mating surfaces which must be melted and solidified each time the valve is opened or closed.

From the foregoing it can be readily seen that there exists a need for vacuum valves and closures which are easily connected and disconnected and which may be baked out at the usual temperatures, e.g., 400° C. Preferably the valve should permit mounting in any position and the number of closures should not be limited by the design. A preferred design should also be easily scaled up and have a large conductance-to-volume ratio. Closing and opening times should be short.

There has now been invented a vacuum valve and closure meeting the foregoing requirements which is completely bakable. The invention is adaptable to use in flange type closures, gate valves and other vacuum closures in which it is desired to seal annular mating edges. A preferred embodiment comprises a gate valve in which there is first provided a seating structure defining an opening to be sealed off. In the embodiment having the fewest parts a flat surface is provided, at one end of the opening, with an annular groove about the opening. Inlet means to the groove for fluid is provided by an interior passage extending through the structure. An overlapping annular, thin, flexible metal gasket is disposed across the annular groove around the opening and is held rigidly in place by inner and outer annular clamping means defining an annular passage above the groove and gasket having generally the same diameter and width as the annular groove. When the opening is to be sealed off, a valve gate having an annular ridge extending from one side of the gate is positioned with the ridge extending into the annular passage of the retaining structure and seated in a fixed position against the metal gasket held between clamping surfaces. When fluid is applied under pressure against the side of the metal gasket opposite from the gate, the gasket is compressed against the annular ridge of the gate to produce a vacuum closure therewith.

In practice, by coating the bearing and rubbing surfaces with a baked-on glass frit filled with molybdenum-disulfide to prevent sticking and galling, it has been found that gate valves constructed as described immediately above may be baked out at temperatures of 400° C. for periods of 24 hours' duration. Other outstanding advantages are that the valve sustains continuous use over periods of many weeks without changing gaskets if care in the application of the frit is exercised. Opening and closure times compare with those of conventional gate valves.

Accordingly, an object of the invention is to provide vacuum valves and closures which are completely bakable, capable of high vacuum integrity, and which have long lives with many openings and closures.

Another object of the invention is to provide vacuum seals in which openings and closing times are relatively short and which may be actuated by mechanical means completely contained within the valve.

Another object of the invention is to provide vacuum closures and valves in which a seal is effected by a fluid-compressed gasket seating against a retaining surface.

Another object of the invention is to provide such a seal in which the inner and outer edges of the gasket are held in a fluid tight relation between mating or pinching, stepped surfaces.

Another object of the invention is to provide such a valve or closure in which galling and binding is prevented through application of a siliceous material to bearing or rubbing surfaces.

A further object is to provide further closure or valve structure in which such a fluid compressed metal gasket is retained against a fixed releasable seating surface to on the face of the gasket, substantially as in the case of the gate valve embodiment, whereby the gasket bears against the rim of the vessel. The fluid pressure is applied through an annular groove 84 disposed on cover 72 directly under the gasket 73. A port 85 drilled from the opposite face of the cover 72 communicates with groove 84, and the pressure may be supplied thereto by a high pressure conduit 86. Annular relief grooves 87 and 88 are disposed along the inner and outer circumferences of gasket 73 for the purpose of deforming gasket 73 slightly into the grooves to insure a tight seal. Ridges on the facing surfaces 77 and 74 (not shown) may be used to further effect a seal. In the preferred embodiment of the seal, gasket 73 is constructed of gold or gold plated metal to preclude oxidation.

While the invention has been disclosed with respect to several preferred embodiments, it will be apparent to those skilled in the art that numerous variations and modifications may be made within the spirit and scope of the invention and thus it is not intended to limit the invention except as defined in the following claim.

What is claimed is:

In a quick disconnect bakeable vacuum closure the combination comprising:
- a valve seat defining a cylindrical valve aperture and having an annular groove on one face thereof circumscribing said aperture,
- an annular soft metal gasket hermetically sealing said annular groove, means for applying fluid pressure against said gasket from within said groove,
- a valve gate having an annular ridge adapted to pressurelessly engage said annular gasket on the side distal said groove at the annular section not supported by said valve seat,
- said valve gate being translationally movable away from and toward said valve seat,
- a portion of the bottom surface of said valve gate being inclined to the plane of the valve seat and having a trapezoidal crossection,
- and a wedging means translationally movable parallel to the plane defined by said valve seat, said wedging means having a trapezoidal crossection of an altitude equal to said translational movement of the valve gate between open and closed positions, and being disposed to engage the inclined portion of said valve gate to provide said translational movement of said valve gate.

References Cited in the file of this patent

UNITED STATES PATENTS

| | | |
|---|---|---|
| 682,547 | Hirt | Sept. 10, 1901 |
| 1,476,344 | McGee | Dec. 4, 1923 |
| 1,826,941 | La Mont | Oct. 13, 1931 |
| 2,850,260 | Perazone | Sept. 2, 1958 |
| 2,873,761 | Tailleferre | Feb. 17, 1959 |
| 3,063,672 | Nichols | Nov. 13, 1962 |

FOREIGN PATENTS

| | | |
|---|---|---|
| 929,920 | Germany | July 7, 1955 |